United States Patent

Galley et al.

[11] Patent Number: 5,732,468
[45] Date of Patent: Mar. 31, 1998

[54] METHOD FOR BONDING A TURBINE ENGINE VANE SEGMENT

[75] Inventors: Ronald L. Galley, Mason; Stephen J. Ferrigno, Cincinnati; L. Timothy Rasch, Fairfield, all of Ohio

[73] Assignee: General Electric Company, Cincinnati, Ohio

[21] Appl. No.: 759,545

[22] Filed: Dec. 5, 1996

[51] Int. Cl.[6] .................................................... B23P 15/00
[52] U.S. Cl. ...................................... 29/889.1; 29/889.22
[58] Field of Search .............................. 29/889.1, 889.22, 29/889.23; 228/119

[56] References Cited

U.S. PATENT DOCUMENTS

| | | | |
|---|---|---|---|
| 4,305,697 | 12/1981 | Cohen et al. | 415/217 |
| 4,726,104 | 2/1988 | Foster et al. | 228/119 |
| 4,830,934 | 4/1989 | Ferrigno et al. | 428/678 |
| 5,156,321 | 10/1992 | Lebrudi et al. | 29/889.1 |
| 5,172,475 | 12/1992 | Amos et al. | 29/889.1 |
| 5,173,255 | 12/1992 | Ross et al. | 420/445 |
| 5,272,809 | 12/1993 | Robertson et al. | 29/889.1 |
| 5,343,694 | 9/1994 | Toborg et al. | 60/39.31 |
| 5,444,911 | 8/1995 | Goodwater et al. | 29/889.7 |
| 5,490,322 | 2/1996 | Goodwater et al. | 29/722 |

*Primary Examiner*—Irene Cuda
*Attorney, Agent, or Firm*—Andrew C. Hess; David L. Narciso

[57] ABSTRACT

An airfoil and a band or platform member of a vane segment, such as of a turbine engine, are bonded at a non-linear clearance slot formed between a shelf in the band and an end and edge of the airfoil. A reservoir bead of a bonding alloy slurry is deposited at one slot opening, a metallic powder is packed into the slot, and another reservoir bead is applied at a slot second opening substantially to close the slot and entrap the powder therein. Then the reservoir beads and powder are heated to flow material of the beads into the clearance slot. This bonds the airfoil and band securely at a deep pocket or blind slot.

14 Claims, 3 Drawing Sheets

METHOD FOR BONDING A TURBINE ENGINE VANE SEGMENT

CROSS REFERENCE TO RELATED APPLICATIONS

This application is related to application Ser. No. 08/759,544 Rasch et al., for "Improved Turbine Engine Vane Segment," and to application Ser. No. 08/759,543 Reverman et al., for "Method and Apparatus for Repairing a Turbine Engine Vane Segment," both filed concurrently with this application.

BACKGROUND OF THE INVENTION

This invention relates to the bonding of an airfoil to a band of a turbine engine vane segment. More particularly in one form, it relates to the repair of a turbine engine vane segment in which one or more airfoils or one or more bands or their combination are replaced and bonded into a vane segment.

During operation in the hot section of a gas turbine engine, portions of air cooled vane segments which have been assembled into a vane assembly, sometimes called a nozzle or nozzle assembly, can become distressed or damaged to the point at which replacement or repair is required to maintain safe, efficient engine operation. Because such air cooled components are complex in design, are made of relatively expensive materials, and are expensive to manufacture, repair is the desired choice. The capability for repeating the repair, if necessary after subsequent operation, is a highly desirable goal for any such repair method.

Various repair methods have been widely reported and used for many years in the gas turbine engine art. One example is U.S. Pat. No. 4,305,697 Cohen et al., patented Dec. 15, 1981, relating to the repair of a gas turbine engine air cooled vane segment. One example of a gas turbine nozzle showing, among other things, the axial, radial, and circumferential positioning of the nozzle and its members in respect to the engine is described in U.S. Pat. No. 5,343,694-Toborg et al., patented Sep. 6, 1994. Identified in such patents are typical vane assemblies to which this invention also relates. The disclosure of each of such patents hereby is incorporated herein by reference.

During repair of such a vane segment, one or more of the components or members of the segment are removed and replaced. Frequently, at least the airfoil is replaced because of its exposure during use to thermal fatigue and oxidation at high temperature operating conditions. Because it is important to carry securely and position the airfoil accurately between the inner and outer bands or platforms of the vane segment, the design of the segment has resulted in at least one deep pocket or blind joint, or both, in the assembly of such members. Deposition of bonding material fully in such joints can be difficult but is essential to enhance the life and performance of such components. In addition, if other repairs, such as crack healing, are to be made to distressed or damaged portions of a vane segment, it is desirable to use as a bonding material for bonding the airfoils and bands a single bonding alloy system or mixture which can be used for both operations. In this way, a single heating cycle can be used for the bonding alloy for both purposes, rather than multiple heating cycles required for different alloys. This results in reduced repair costs.

BRIEF SUMMARY OF THE INVENTION

The present invention, in one form, provides a method for bonding an airfoil member and a band member, at least one of which includes a distressed, or damaged, portion resulting from previous use in engine operation. This form uses a single bonding ahoy system for bonding the airfoil and band members as well as repairing the distressed portion concurrently in a single bonding cycle.

The present invention, in a more specific form, provides a method for bonding an airfoil and a band of a vane segment at an airfoil shaped opening in a radially inward facing or airflow surface of a band. The band includes a shelf spanning a portion of the airfoil shaped opening toward a band radially outward facing or non-airflow surface and functioning as a seat or stop for an end of the airfoil disposed in the airfoil shaped slot for bonding therewith. Formed between the shelf and the airfoil end and an edge portion of the airfoil is a relatively deep pocket or blind joint in the form of a non-linear clearance slot having spaced apart slot openings. In addition to the non-linear clearance slot, a substantially linear clearance slot through the band is formed between a wall of the airfoil shaped opening and the airfoil extending axially away from the shelf. According to the present invention, to bond the members at the deep pocket or blind joint, a first reservoir bead of a bonding alloy system in the form of a slurry is deposited at a first slot opening, a metallic powder is deposited in the slot from a second slot opening to substantially fill the non-linear slot, for example by vibrating the powder, and a second reservoir bead of the bonding alloy system is deposited at the second slot opening to substantially close the clearance slot, entrapping the powder therein. Similarly, the linear slot is filled by sandwiching metallic powder between spaced apart reservoir beads of the bonding alloy system. The same bonding alloy system can be used for other required repair of distressed portions of the vane segment, for example crack healing. Subsequently, a single bonding cycle or heating of the beads of the bonding alloy system and of the powder provides a bond between the shelf and airfoil end and edge portion at the blind joint or deep pocket as well as between walls of the airfoil shaped opening and the airfoil. In addition, concurrently it repairs other, distressed, portions of the vane segment to which the bonding alloy system has been applied.

DETAILED DESCRIPTION OF THE INVENTION

Repair of gas turbine engine turbine vane segments has included replacement of certain segment members which have been damaged beyond repair as well as the repair of portions of certain members which have been less seriously damaged. If a member is to be replaced, it must involve bonding of an airfoil to a band. Because of the complex design of such bands to hold securely the airfoil in the band, such bonding occurs at the above discussed deep pockets and/or blind joints between a band and an airfoil. A strong and more complete bond at such recessed areas is needed as a result of use of improved, stronger high temperature materials of the segment, particularly the airfoil. The present invention provides a method for providing such a bond using a bonding material, herein called a bonding alloy or bonding alloy system, which can be used concurrently to repair, such as healing of cracks, other portions of the vane segment, employing a single bonding cycle to accomplish both purposes.

Figure 1:
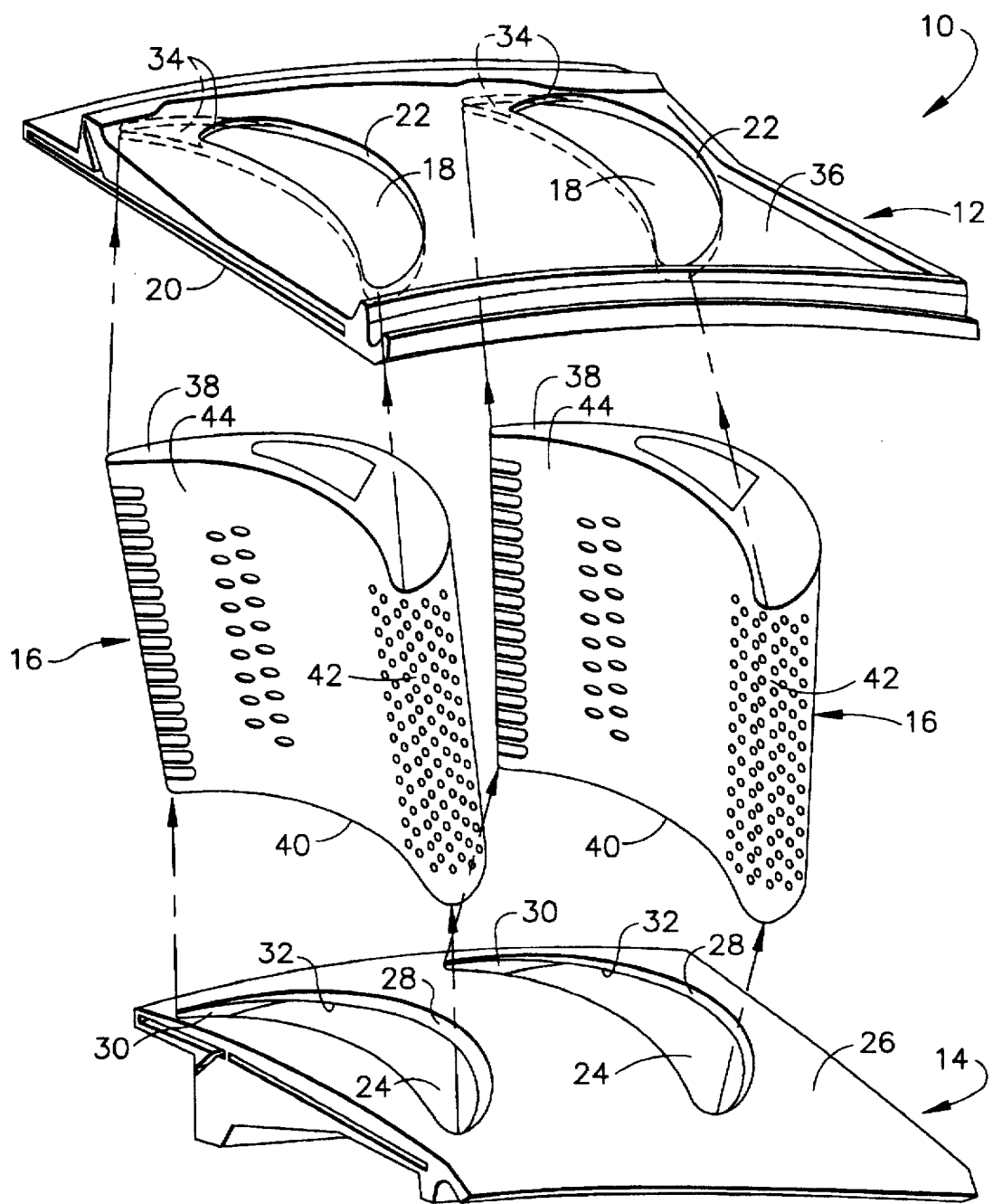
FIG. 1 is an exploded, perspective view of a gas turbine engine vane segment including an inner band or platform, an outer band or platform, and a pair of air cooled airfoils therebetween.

The type of vane segment to which the present invention relates is shown in the exploded perspective view of FIG. 1 of the drawings, in which like numbers have like meanings. The vane segment 10 includes, as segment members, an outer band or platform shown generally at 12, an inner band or platform shown generally at 14, and a pair of airfoils 16 between the spaced apart bands. The outer band 12 includes a pair of airfoil shaped openings 18 through radially inward facing or airflow surface 20 and defined by walls 22 of openings 18. The inner band 14 includes a pair of airfoil shaped openings 24 through radially inward facing or airflow surface 26 and defined by walls 28 of openings 24.

Spanning the trailing edge portion of openings 24 in inner band 14 are shelves 30 generally closing a portion of openings 24 toward their radially outward facing or non-airflow surfaces 32. Spanning the trailing edge portion of openings 18 in the aft portion of outer band 12 are shelves 34, shown in more detail in FIGS. 2 and 4, and closing a portion of openings 18 toward their radially outward facing or non-airflow surfaces 36.

Figure 2:
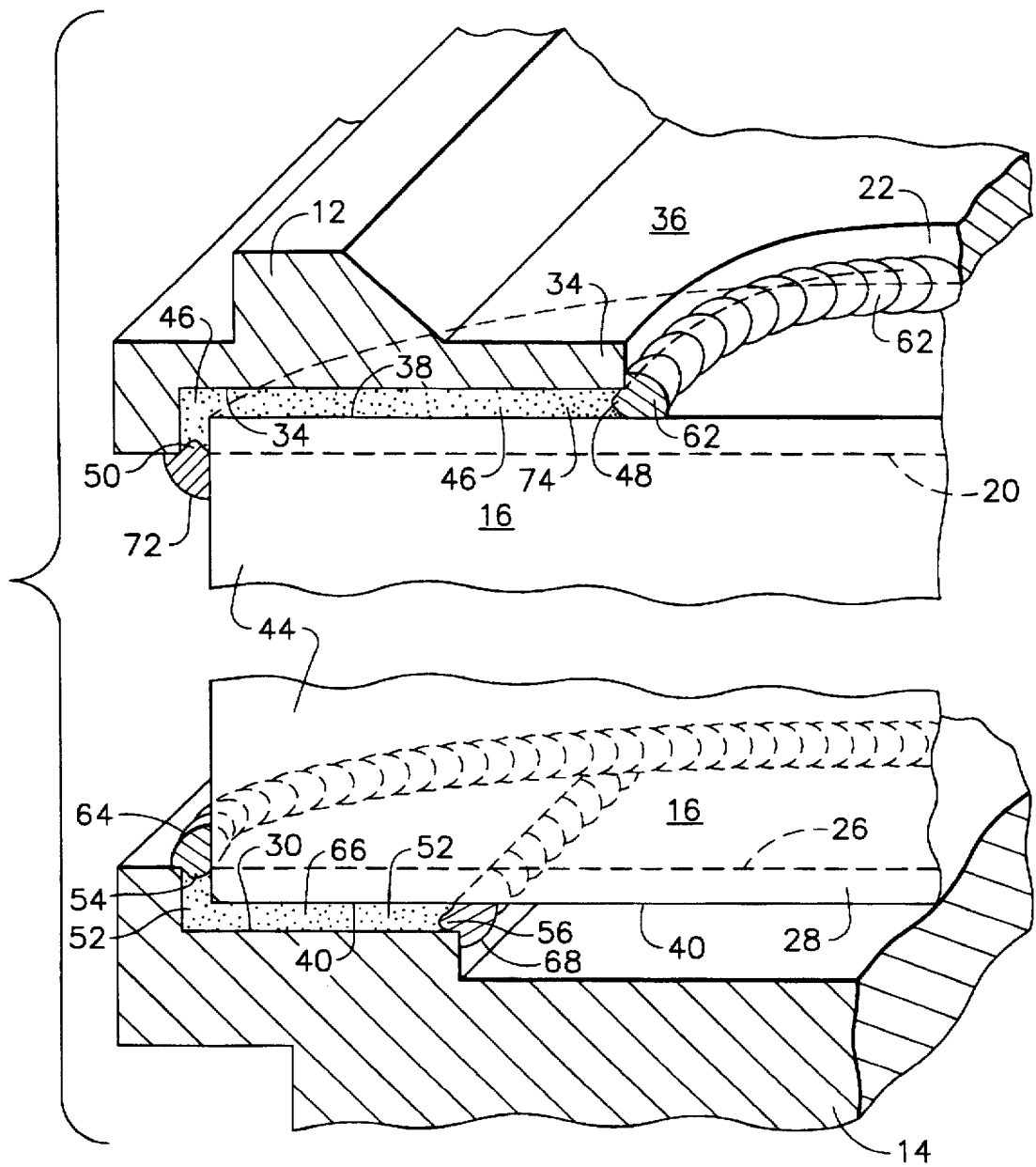
FIG. 2 is a fragmentary, partially sectional view of the trailing edge portion of an airfoil disposed between the inner and outer bands prior to bonding, showing the non-linear slot at shelves of the bands and the reservoir beads at and metallic powder in the slots.

Airfoils 16 each include a radially outer end surface 38, a radially inner end surface 40, and therebetween a leading edge portion 42 and a trailing edge portion 44. When assembled as shown in FIG. 2, the airfoil radially outer end surface 38 at trailing edge portion 44 cooperates and registers with shelf 34 to define therebetween a non-linear first clearance slot 46 having a slot first opening at 48 and a slot second opening at 50. The airfoil radially inner end surface 40 at trailing edge portion 44 cooperates and registers with shelf 30 to define therebetween a non-linear second clearance slot 52 having a slot first opening at 54 and a slot second opening at 56.

Figure 3:
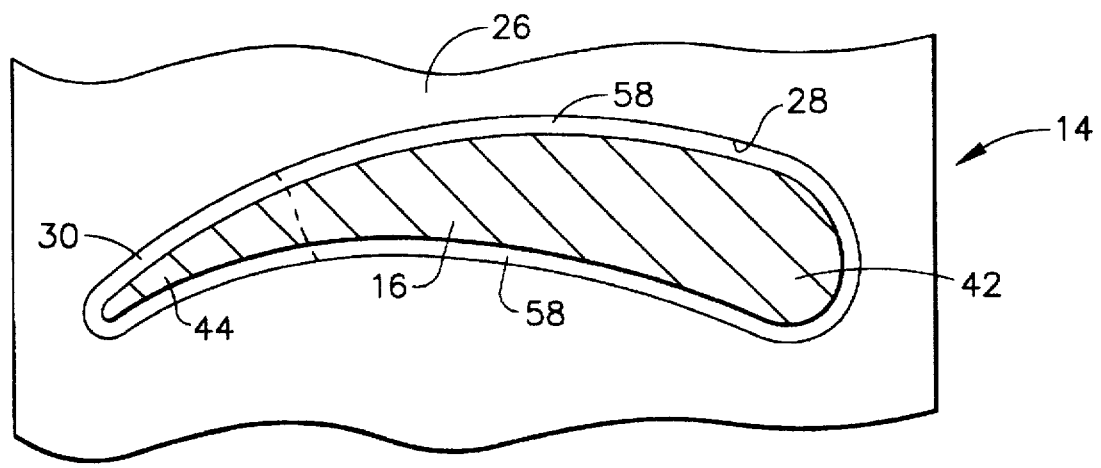
FIG. 3 is a partially sectional plan view through the airfoil toward the inner band prior to the deposition of the beads and powder.

In addition to the above described non-linear slots which constitute deep pocket-type or blind joints between the bands and the airfoils, such assembly forms substantially linear slots between the airflow and non-airflow surfaces of the bands at areas at which the airfoil end surfaces communicate directly through the airfoil shaped openings in the bands. These are shown in the plan views of FIGS. 3 and 4 as third slot 58, between airfoil 16 and wall 28 in inner band 14, and fourth slot 60, between airfoil 16 and wall 22 in outer band 12. Each of slots 58 and 60 include a slot first opening and a slot second opening, generally aligned one with the other.

In one example of the practice of the present invention, a gas turbine engine turbine vane segment, including an inner band, an outer band and a pair of airfoils therebetween, as described in connection with FIG. 1 and all made of the well known X-40 Co base alloy having a coefficient of thermal expansion of about $9.2 \times 10^{-6}$ in/in/°F., was examined after engine operation. It was determined that the airfoils were damaged to the point at which they had to be replaced but the bands were selected to be reassembled with replacement airfoils. Also, this presented the opportunity to use an improved strength material with longer elevated temperature operating life capability for the replacement airfoils. In this example, the replacement airfoils were cast from a Ni base superalloy of improved strength and having a directionally oriented microstructure, which includes directionally solidified as well as single crystal microstructures. The superalloy used in this example sometimes is referred to as directionally solidified Rene' 142 alloy (DSR 142 alloy), generally described in U.S. Pat. No. 5,173,255- Ross et al., patented Dec. 22, 1992. That alloy had a coefficient of thermal expansion of about $7.7 \times 10^{-6}$ in/in/°F., different from and less than that of the X-40 alloy. Use of such an improved airfoil material requires an improved bonding arrangement in combination with a higher strength bonding material.

The airfoils were separated from the inner and outer bands by mechanically cutting the airfoils near each band and refinishing airfoil shaped openings in the bands to receive the replacement airfoils. The separated bands, constituting separated segment members, were reassembled with replacement airfoils into a vane segment preform in the arrangement shown in FIG. 1, with the airfoil end and trailing edge surfaces disposed in the airfoil shaped openings and at the shelves of the inner and outer bands as shown in FIG. 2. This preform assembly defined the above described first, second, third, and fourth clearance slots.

Clearance between surfaces of the slots could be up to about 0.05" thereby requiting the use of a "wide gap" type of bonding or brazing alloy. In this example, selected for use as a bonding alloy system was a bonding mixture of powders, sometimes referred to as SA-650 material, which has improved high temperature strength and oxidation resistance and which can be and is used to repair or heal cracks in other portions of the vane segment. That bonding mixture is described in U.S. Pat. No. 4,830,934- Ferrigno et al., patented May 16, 1989, the disclosure of which hereby is incorporated herein by reference. To provide the strength and oxidation resistance properties required for operation of the vane assembly and compatibility with the materials from which its members were made, as well as the capability to bridge and fill gaps up to about 0.05", SA-650 material comprised a mixture of four distinct alloy powders. Three were based on Ni and one was based on Co, including powder alloys such as alloys 6, 7 and 11 of the above incorporated Ferrigno et al. patent. Therefore, the powder alloy mixture SA-650 material included relatively large amounts, greater than about 20 weight % each, of Co as well as Ni, along with other alloying elements compatible with elements in the Ni base airfoils and the Co base bands. Because of the relatively large amounts of Co and Ni, the bonding alloy system had a coefficient of thermal expansion compatible with that of both the X-40 Co base alloy and the DSR 142 Ni base alloy. The term "compatible" as used herein is intended to mean that relative expansion and contraction of the dissimilar alloys of the members of the vane segment during high temperature operation and cycling, common in gas turbine engine operation, at the joints or interfaces bonded according to the present invention will not result in fracture of the bond therebetween. Selection of the bonding alloy system in this example to include greater than about 20 weight % each of Co and Ni provided the bonding alloy system with such compatibility. It is believed that the coefficient of thermal expansion of the bonded joint in this example is between that of the Co base and Ni alloys being bonded.

The powder mixture was made into a slurry, which could maintain a shape and resist excessive flow when applied to a surface or slot opening, by blending the powder mixture with a common binder used in the brazing art, preferably of the type which decomposes substantially without residue upon heating. The term "bead" is used herein to refer to such a general shape. When applied to an opening of a slot, such a bead constituted a reservoir and became a reservoir bead, as the source of bonding material for the slot upon heating to flow material of the mixture.

In this example and for each replacement airfoil, referring to FIG. 2, a first reservoir bead 62 for first clearance slot 46, of about 0.1", was deposited at the slot first opening 48 on the non-airflow surface 36 of the outer bands 14. This substantially closed the slot first opening 48 of first clearance slot 46. In addition, this reservoir bead was continued and extended around walls of airfoil shaped opening 18 at the non-airflow path slot first opening of the fourth slot 60, FIG. 4, which extended through the outer band 12 between the airflow and non-airflow surfaces of the outer band. Similarly on the non-airflow side of the inner band, a reservoir bead was applied to the non-airflow side of the inner band 14 to substantially close a slot first opening of third clearance slot 58, FIG. 3, which extended through the inner band 14 between the airflow and non-airflow surfaces of the inner band.

With reference to FIG. 2 and inner band 14, in order to provide a dam for slot first opening 54 of second clearance slot 52 between airfoil end 40 and shelf 30, a first reservoir bead 64 for second clearance slot 52, of about 0.05", was applied at slot first opening 54, on the airflow side of the inner band and extending from the airfoil trailing edge 44 toward the leading edge 42 both on the concave and convex surfaces, at least to a point radially opposite the first reservoir bead which had been deposited on the inner band non-airflow surface.

With the both first reservoir beads deposited and functioning as dams at the slot first openings, a dry metallic powder 66, FIG. 2, in this example the above identified SA-650 powder mixture, was deposited through the slot second opening 56 of second clearance slot 52 between shelf 30 of inner band 14 and airfoil end 40. The powder was vibrated to substantially fill and pack the powder in such deep pocket existing between such opposing, cooperating members. To hold the packed powder in place for subsequent processing, Nicrobraze 520 cement was applied over the powder at slot opening 56. Then to close second clearance slot 52 and entrap powder 66 therein, a second reservoir bead, 68 for second clearance slot 52, of the slurry of the SA-650 powder mixture was applied at slot second opening 56 adjacent edge 70 of shelf 30.

Figure 4:
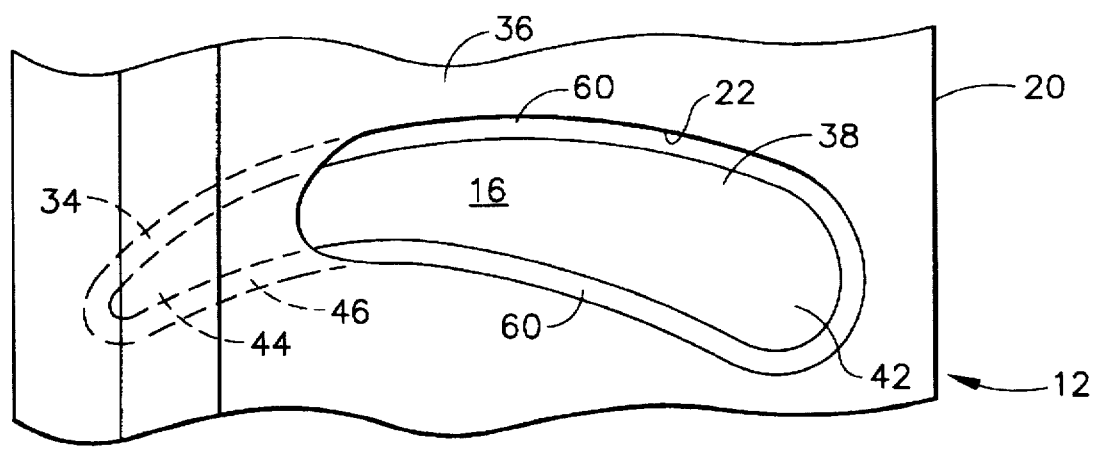
FIG. 4 is a plan view toward the top of the outer band, with the airfoil disposed in the airfoil shaped opening and at the shelf.

The above described first, third and fourth clearance slots, 46 in FIG. 2, and 58 and 60 in FIG. 4, respectively, were filled from the airflow surfaces side with a dry powder which was vibrated to substantially fill the slots. Such slots had been substantially closed by reservoir bead 62 for first clearance slot 46 and reservoir beads at one of the slot openings of each of the other slots, in this example as described above on the non-airflow or radially outward facing surfaces of the bands. The powder 74 to fill such slots was a Ni base Ni-Cr alloy, commercially available as Ni-chrome ahoy powder, which was applied through the slot second openings on the airflow or radially inward facing surfaces of the inner and outer bands. Ni-chrome alloy dry powder was used here to enhance flow and function as a "wetting agent" for material from the reservoir beads when such beads were heated to a point at which the powder mixture would flow in the clearance slots. To hold the packed powder in place for subsequent processing, Nicrobraze 520 cement was applied over the powder at each of the slot second openings. In this way, all of the clearance slots were filled with a dry powder. In this example, it was not found necessary to apply a reservoir bead over the cement. However, if desired, such a bead can be applied as an additional source of bonding alloy for the linear-type slots.

To complete application of the reservoir beads at both slot openings of the first and second clearance slots to entrap and sandwich metallic powder within such slots between the reservoir beads, a second reservoir bead 72 for first clearance slot 46, FIG. 2, of the slurry of SA-650 powder mixture was applied at slot second opening 50 of first clearance slot 46 at outer band 12. Such bead 72 was about 0.5" and extended about the trailing edge portion 44 of airfoil 16 on the airflow, radially inward facing surface of outer band 12 to close the slot second opening of the powder filled first clearance slot.

When examining the vane segment for damage after use in engine operation, it was observed that distressed portions such as cracks or other damage, such as erosion or abrasion, required repair. For example, cracks can occur in the outer band, particularly in the aft portions. As was mentioned above, one important feature of the present invention is the selection of a metallic material which can be used concurrently in a single bonding cycle both for bonding members of the vane segment as well as for repairing distressed areas of other segment portions. In this example, SA-650 powder mixture, as a bonding ahoy system, was such a material. A slurry of the above described SA-650 powder mixture, which had been used for the reservoir beads, was applied for crack healing to the other damaged portions of the vane segment after completion of the above described processing steps.

The vane segment preform prepared with reservoir beads, powder in the slots and slurry at damaged areas as above in this example was then concurrently bonded and repaired in a single bonding cycle by heating the preform at about 2225° F. for about ½ hour followed by diffusion at about 2125° F. for about 2 hours. The heat treatment bonding cycle was at a temperature sufficient to flow material of the reservoir beads from the slot first and second openings into the slot and to diffuse the bonding material into surfaces of the members being joined. In some of the wide gap-type of powdered bonding or brazing alloys, such as SA-650 material, not all of each of the powder components may melt completely. This provides the gap-filling capability and structure. However, the processing temperature is sufficient to enable flow of the powder mixture into and along the juncture being bonded and position the material for subsequent diffusion. The vane segment resulting from this example had bands securely bonded to improved replacement airfoils, with the bands having been repaired concurrently with the bonding during a single heat treatment cycle.

The present invention has been described in connection with specific embodiments, examples and combinations. However, it will be understood by those skilled in the arts associated with the invention that these are typical of, rather in any way limiting on, the invention which is capable of variations and modifications without departing from the scope of the appended claims.

We claim:

1. In a method for bonding an airfoil member to a band member of a vane segment, at least one of the members including a distressed portion resulting from prior use of the vane segment and requiring repair, the steps of:
applying a single bonding alloy system between the band member and the airfoil member as well at the distressed portion; and then, conducting a single bonding cycle to bond, concurrently, the band member and the airfoil member as well as to repair the distressed portion.

2. The method of claim 1 in which the single bonding alloy system can fill gaps up to about 0.05".

3. The method of claim 1 in which:
   the band is made of a Co base alloy having a first coefficient of thermal expansion; and,
   the airfoil is made of a Ni base superalloy having a directionally oriented microstructure and a second coefficient of thermal expansion.

4. The method of claim 3 in which the single bonding alloy system includes greater than about 20 weight % each of Ni and Co resulting in a third coefficient of thermal expansion for the bonding alloy system compatible with the first and second coefficients of thermal expansion of band and airfoil.

5. In a method for bonding an airfoil, including a leading edge portion and a trailing edge portion, and a band of a vane segment at an airfoil shaped opening, including a wall defining a leading edge portion and a trailing edge portion in a first surface of the band, the airfoil including an airfoil end surface and an airfoil edge surface portion each intersecting and extending angularly from the airfoil end surface, the band including a shelf spanning a portion of the airfoil shaped opening at a second surface of the band, the shelf shaped to receive a portion of the airfoil end surface and the airfoil edge surface intersecting the airfoil end surface, the steps of:
   providing a slurry of a metallic bonding alloy powder and a binder;
   disposing the airfoil end surface in the airfoil shaped opening at the shelf to define a non-linear clearance slot between the airfoil end and edge surfaces and the shelf and the wall of the airfoil shaped opening, the slot including a slot first opening and a slot second opening spaced apart one from the other;
   depositing a first reservoir bead of the slurry at the slot first opening;
   depositing a metallic powder into the slot from the slot second opening to substantially fill the slot between the slot first and second openings;
   depositing a second reservoir bead of the slurry at the slot second opening to entrap the powder within the slot and to substantially close the slot second opening; and then,
   heating the first and second reservoir beads and the powder to a temperature which will result in flow of material of the beads into the slot from the slot first and second openings.

6. The method of claim 5 in which the shelf is at the trailing edge portion of the airfoil shaped opening and the airfoil edge is at the trailing edge portion of the airfoil.

7. The method of claim 5 for bonding an airfoil between an inner band and an outer band of a turbine engine vane segment, the bands being spaced apart one from the other, each band including an airfoil shaped opening which includes a wall defining a leading edge portion and a trailing edge portion in an airflow surface of the band, the airfoil including a radially inner end surface and a radially outer end surface, the end surfaces shaped to register, respectively, with the airfoil shaped openings in the inner and outer bands each band including a shelf spanning a portion of the airfoil shaped opening toward a non-airflow surface of the band, the steps of:
   disposing the radially inner end and the radially outer end surfaces of the airfoil, respectively, in the airfoil shaped opening in the airflow surfaces of the inner and outer bands and at each shelf to define a non-linear first and a non-linear second clearance slot respectively between each airfoil end and edge surface and the shelf and opening wall of the respective airfoil shaped opening, each slot including a slot first and a slot second opening spaced apart one from the other;
   depositing the first reservoir bead at each slot first opening;
   depositing the metallic powder in each slot from the slot second opening;
   depositing the second reservoir bead at each second slot opening; and then,
   heating the first and second beads and the powder.

8. The method of claim 7 in which:
   the airfoil edge surface portion which intersects and extends angularly from each radially inner and outer end surface of the airfoil is at the trailing edge portion of the airfoil;
   each shelf spans the trailing edge portion of the airfoil shaped opening;
   the first clearance slot is at the outer band between the shelf of the outer band and the radially outer airfoil end surface, with the slot first opening of the first clearance slot being between the airfoil radially outer end surface and a wall of the airfoil shaped opening in the outer band, and the slot second opening of the first clearance slot being between the airfoil trailing edge and the outer band; and,
   the second clearance slot is at the inner band between the shelf of the inner band and the radially inner airfoil end surface, with the slot first opening of the second clearance slot being between the airfoil trailing edge and the inner band, and the slot second opening of the second clearance slot being between the airfoil radially inner end surface and an edge of the shelf.

9. The method of claim 8 for repairing a turbine engine vane segment comprising at least one airfoil carded between the spaced apart inner and outer bands including the steps of:
   separating the airfoil and the bands to provide separated segment members;
   selecting for reassembly at least one separated segment member;
   providing for reassembly with the selected separated member at least one replacement member;
   assembling the selected separated and replacement members into a vane segment preform with the radially inner end and outer end surfaces of the airfoil disposed, respectively, in the airfoil shaped openings through the airflow surfaces in the inner and outer bands respectively at each shelf to define therebetween:
   a) the non-linear first clearance slot and the non-linear second clearance slot at the trailing edge portion of each end of the airfoil;
   b) a third substantially linear clearance slot through the inner band and between the inner band airfoil shaped opening wall and the airfoil leading edge portion intersecting the airfoil radially inner surface, the third clearance slot extending from the shelf in the inner band toward the airfoil leading edge portion and having a slot first opening at one end of the slot and a slot second opening at another end of the slot; and,
   c) a fourth substantially linear clearance slot through the outer band and between the outer band airfoil shaped opening wall and the airfoil leading edge portion intersecting the airfoil radially outer surface, the fourth clearance slot extending from the shelf in the outer band toward the airfoil leading edge portion and a slot first opening at one end of the slot and a slot second opening at another end of the slot;

providing the slurry of the metallic bonding alloy;

depositing the first reservoir bead at the first slot opening of each slot;

depositing a metallic powder into each slot from each slot second opening and vibrating the powder to substantially fill each slot between the slot first and second openings;

depositing the second reservoir bead at the slot second opening of the first and second clearance slots to entrap the powder within the slot and to substantially close the slot second openings; and then, heating the reservoir beads and the powder to a temperature which will result in flow of material of the beads into the slots from the slot first and second openings.

10. The method of claim 9 in which:

the first reservoir bead is provided at each slot first opening;

the metallic powder is deposited into the second clearance slot and the second reservoir bead is deposited at the second slot opening of the second clearance slot;

the metallic powder is deposited into the first, third and fourth clearance slots; and then, the second reservoir bead is deposited at the slot second opening of each of the first, third and fourth clearance slots.

11. The method of claim 10 in which:

the bonding alloy powder of the slurry is applied to other portions of the vane segment after depositing the second reservoir beads and before heating the beads and the powder; and then, heating the vane segment concurrently to flow material from the beads into the slots and to repair the other portions of the vane segment.

12. The method of claim 10 in which the metallic powder deposited in the second clearance slot is the metallic bonding alloy of the slurry.

13. The method of claim 12 in which the metallic powder deposited in the first, third and fourth clearance slots consists essentially of a Ni base Ni-Cr alloy.

14. The method of claim 10 in which a cap of a cement which decomposes substantially without residue upon heating is applied over the powder filling the third and fourth clearance slots to hold the powder prior to heating.

* * * * *